(12) United States Patent
Coomes

(10) Patent No.: US 11,731,074 B1
(45) Date of Patent: Aug. 22, 2023

(54) REUSABLE, AIR CLEANING DEVICE FILLED WITH GRANULAR, ACTIVATED CARBON

(71) Applicant: IBOW2U LLC, Forest Hill, MD (US)

(72) Inventor: Michael Coomes, Forest Hill, MD (US)

(73) Assignee: IBOW2U LLC, Forest Hill, MD (US)

( * ) Notice: Subject to any disclaimer, the term of this patent is extended or adjusted under 35 U.S.C. 154(b) by 0 days.

(21) Appl. No.: 18/122,521

(22) Filed: Mar. 16, 2023

(51) Int. Cl.
  *B01D 53/04* (2006.01)
  *B01J 20/20* (2006.01)
  *B01J 20/28* (2006.01)

(52) U.S. Cl.
  CPC ......... *B01D 53/0446* (2013.01); *B01D 53/04* (2013.01); *B01J 20/20* (2013.01); *B01J 20/2805* (2013.01); *B01J 20/28016* (2013.01); *B01D 2253/102* (2013.01); *B01D 2257/708* (2013.01); *B01D 2257/90* (2013.01)

(58) Field of Classification Search
  CPC ................ B01D 53/04; B01D 53/0446; B01D 2253/102; B01D 2257/708; B01D 2257/90; B01J 20/20; B01J 20/28016; B01J 20/2805
  USPC ..... 55/501, 511, 516, 518; 96/134, 151, 154
  See application file for complete search history.

(56) References Cited

U.S. PATENT DOCUMENTS

| | | | | |
|---|---|---|---|---|
| 4,514,197 A | * | 4/1985 | Armbruster | B01D 46/10 96/138 |
| 4,699,681 A | * | 10/1987 | Kasmark, Jr. | B01D 46/30 427/244 |
| 4,781,526 A | | 11/1988 | Mead | |
| 4,917,862 A | * | 4/1990 | Kraw | B01D 53/12 95/134 |
| 5,354,365 A | * | 10/1994 | Youn | B01D 53/0446 96/135 |
| 5,733,350 A | * | 3/1998 | Muller | B01D 53/0407 55/482 |
| 6,156,089 A | * | 12/2000 | Stemmer | B01D 46/0036 55/467 |
| 6,527,838 B2 | | 3/2003 | Volo | |
| 6,692,555 B2 | * | 2/2004 | Oda | F02M 35/024 55/516 |

(Continued)

OTHER PUBLICATIONS

Machine generated English translastion of JP 2000-325724 A, published Nov. 2000.*

*Primary Examiner* — Frank M Lawrence, Jr.
(74) *Attorney, Agent, or Firm* — Larry J. Guffey, Esq.; Oliver & Grimsley, LLC

(57) ABSTRACT

A reusable, air cleaning device includes: (a) a top frame having a top perimeter edge that encloses a top area, (b) a plurality of top screens, each with a top bounding edge and configured to cover the top area, (c) a bottom frame having a bottom perimeter edge that encloses a bottom area, (d) a plurality of bottom screens, each with a bottom bounding edge and configured to cover the bottom area, (e) an attachment device configured to temporarily hold the frames together so that the top frame lies above the bottom frame to create a confined space between the screens, (f) a locking device configured to temporarily lock the frames together, (g) activated carbon granules that are distributed on the bottom screen, and wherein the plurality of screens are configured to have a combination of sizes that prevent the activated carbon granules from passing through the screens.

20 Claims, 6 Drawing Sheets

(56) References Cited

U.S. PATENT DOCUMENTS

| | | | |
|---|---|---|---|
| 7,153,565 B1* | 12/2006 | Nabata | B32B 27/32 55/514 |
| 7,393,272 B2 | 7/2008 | Sundet | |
| 8,062,403 B2* | 11/2011 | Goode | B01D 46/0005 55/482 |
| 8,137,426 B2 | 3/2012 | Whittemore | |
| 8,979,965 B2 | 3/2015 | Minaeeghainipour | |
| 2004/0031248 A1* | 2/2004 | Lindsay | F24F 8/10 55/385.3 |
| 2004/0146436 A1* | 7/2004 | Ham | B01D 53/0407 422/177 |
| 2012/0272829 A1* | 11/2012 | Fox | B01J 20/10 96/154 |
| 2020/0330957 A1* | 10/2020 | Maanum | B01J 20/265 |

* cited by examiner

SECTION A-A

REUSABLE, AIR CLEANING DEVICE FILLED WITH GRANULAR, ACTIVATED CARBON

BACKGROUND OF THE INVENTION

1. Field of the Invention

The present invention generally relates to gas separation and air filtration. Specifically, the present invention is directed to a screening device for removing odors, noxious vapors and volatile organic compounds (i.e., gaseous pollutants) that pass through it.

2. Description of the Related Art

Replaceable air filters for cleaning the air that passes through them are well known in the art. Examples include: U.S. Pat. No. 4,781,526 to Mead (bracket structure mounted on fan for receiving a filter in sliding fashion); U.S. Pat. No. 7,393,272 to Sundet (adhesive-attached hooks mounted on the sides of the fan, with elastic straps extending through the hooks to hold a filter to the face of the fan); U.S. Pat. No. 6,527,838 to Volo et al. (stick-on right-angled brackets mounted on the fan with adjustable clearance to snugly hold filters against the faces of a fan); U.S. Pat. No. 8,137,426 to Whittemore (filter frame removably mounted against the face of a box fan with straps or cords to receive a filter), and U.S. Pat. No. 8,979,965 to Minaeeghainipour (magnetically mounting filter to fan).

Other examples include those that use the known ability of activated carbon granules to clean odors, noxious vapors and volatile organic compounds (i.e., gaseous pollutants) from the air that passes over these granules. When this technology is incorporated into the typical design for replaceable air filters (i.e., a flat, fibrous mat of a specified thickness), it usually involves spraying a liquid form of activated carbon onto these filters. The disadvantages of this spraying are the increasing of such sprayed air filters' resistance to air flow through them, and a reduction in the duration of their useful lives before they need to be replaced. Additionally, the effectiveness of such sprayed, air filters in cleaning odors, noxious vapors and volatile organic compounds (i.e., gaseous pollutants) from the air that passes through them is reported greatly reduced compared to that of passing air through beds of activated carbon granules that have the same thickness as such a sprayed air filter.

Despite these previous attempts at cleaning gaseous pollutants from air using the known cleaning attributes of activated carbon, there appear to be no such commercially viable and effective air cleaning products in the marketplace. Thus, it would appear that there continues to exist the need for a device that can clean gaseous pollutants from air in a convenient, safe, economical and aesthetically acceptable manner. The present invention seeks to provide such a device.

DESCRIPTION OF THE PREFERRED EMBODIMENT

Figure 1:
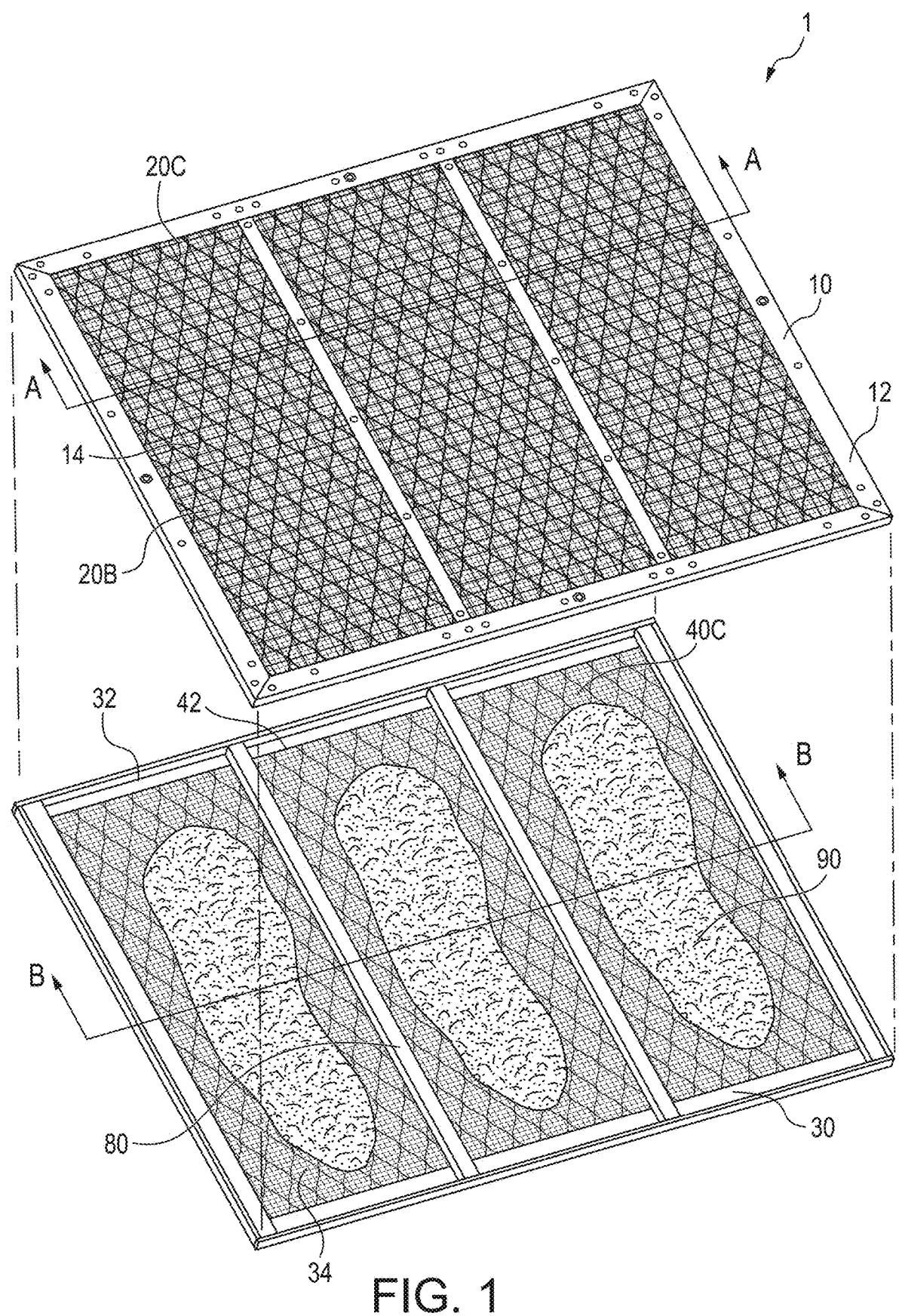
FIG. 1 is a top, perspective view of the present invention when its two frames have been separated to show the confined space that exists between them when top frame is placed over the bottom frame.

Recognizing the need for a device that can clean odors, noxious vapors, and volatile organic compounds (i.e., gaseous pollutants) from air in a convenient, safe, economical and aesthetically acceptable manner, the present invention seeks to provide such a device.

Various aspects, advantages, features and embodiments of the present invention are included in the following description of exemplary examples thereof, which description should be taken in conjunction with the accompanying drawings. All patents, patent applications, articles, other publications, and things referenced herein are hereby incorporated herein by this reference in their entirety for all purposes. To the extent of any inconsistency or conflict in the definition or use of terms between any of the incorporated publications, documents or things and the present application, those of the present application shall prevail.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

FIG. 1 is a top, perspective view of the present invention when its two frames have been separated to show the confined space that exists between them when, being used, the top frame is placed over the bottom frame.

The present invention, in the form of a reusable, air cleaning device 1, is seen to include: (a) a top frame 10 having a top perimeter edge 12 that encloses a top surface area 14, (b) a plurality of top screens 20, which for the embodiment shown has three top screens 20A, 20B, 20C, each with a top bounding edge 22 and configured to cover the surface area of the top frame, (c) a bottom frame 30 having a bottom perimeter edge 32 that encloses a bottom surface area 34, (d) a plurality of bottom screens, which for the embodiment shown has three bottom screens 40A, 40B, 40C, each with a bottom bounding edge 42 and configured to cover the surface area of the bottom frame, (e) an attachment device 50 configured to temporarily hold the frames together so that the top frame lies above the bottom frame to create a confined space 60 between the screens, (f) a locking device 70 configured to temporarily lock the frames together, (g) one or more braces 80 that attach between distal points on the bottom frame's perimeter edge 32 and are configured to provide rigidity to the bottom frame, and (h) activated carbon granules (preferably made from coconut shells) 90 that are distributed on the plurality of bottom screens, and wherein this plurality of screens is configured to have a combination of sizes that prevent the activated carbon granules from passing through these screens.

Figure 2:
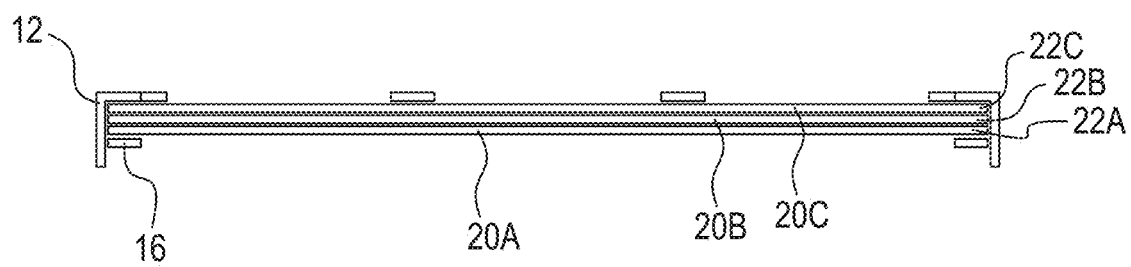
FIG. 2 is an end view of the top frame taken along the sight line A-A shown in FIG. 1.

FIG. 2 is an end view of the top frame taken along the sight line A-A shown in FIG. 1. In this preferred embodiment, the perimeter edge 12 of the top frame is seen to be made of angled members that are joined at their ends. The top bounding edges 22A, 22B, 22C of the three overlapping top screens 20A, 20B, 20C are seen to extend to the frame's perimeter edge where they are attached to it with a and an attaching anchor (e.g., a rivet). For this preferred embodiment, the shape defined by the top frame's perimeter edge is that of a square; however, it could just as easily have been that of any other rectangle (note: A square is a special case of a rectangle).

Figure 3:
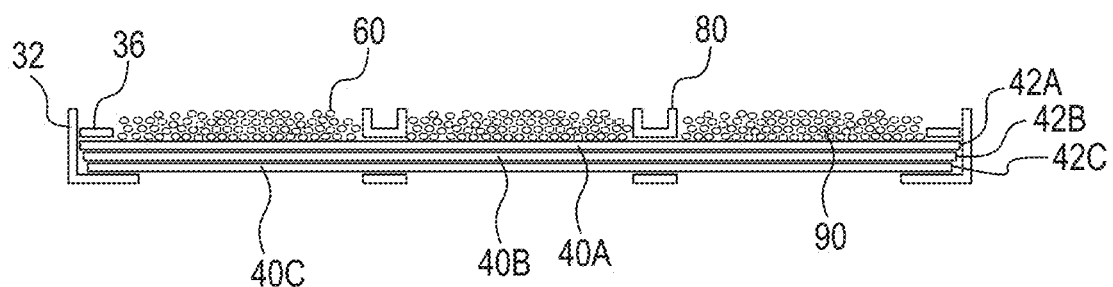
FIG. 3 is an end view of the bottom frame taken along the sight line B-B shown in FIG. 1.

FIG. 3 is an end view of the top frame taken along the sight line B-B shown in FIG. 1. In this preferred embodiment, the perimeter edge 32 of the bottom frame is seen to be made of angled members that are joined at their ends. The bottom bounding edges 42A, 42B, 42C of the three overlapping bottom screens 40A, 40B, 40C are seen to extend to the frame's perimeter edge where they are attached to it with a strip of framing material 36 and an attaching anchor (e.g., a rivet). To create the bottom frame's confined space 60 and provide this frame with rigidity, a brace 80 in the form a channel beam is extended between opposite points on its perimeter edge 32. Also shown in FIG. 3 are granules 90 of the activated carbon granules that are spread on the bottom screens 40. From experimentation it was found that a commercially available, 4×8 mesh size of activated carbon granules, when stacked to a layer height in the range of 0.25-0.75 inches, were highly effective in cleaning gaseous pollutants from the air that passed through such a layer of granules. For completeness, it can be noted that such a 4×8 mesh size container of activated carbon granules is noted by its manufacturer as characterized by having various shapes or sizes such that approximately 90% (87%-93%) by weight of these granules will pass through a #4 sieve and approximately 90% (87%-93%) by weight will be captured by a #8 sieve.

For the purposes of the present invention, we specify the sizes of the activated carbon granules 90 that are suitable for use with it as being characterized by having a size such that approximately 90% by weight of these granules pass through a sieve in the range of a #3-#5 sieve, and approximately 90% by weight are captured by a sieve in the range of a #7-#9 sieve.

Having settled on the use of the above sized activated carbon granules 90, we experimented with various combinations of screening materials to identify a combination what would be effective in preventing these granules from passing through the present invention's combination of top and bottom screens. The following combination of three screens for both the top and bottom frames was found to be highly effective: (a) a fine screen 20A, 40A that has a plurality of openings, and with each of these openings having a surface area that is in the range of 0.0035-0.0160 inches$^2$ (e.g., as might be made by a screen having 1/16 inch by 1/16 inch square opening and made from PVC coated, nylon wire), (b) a hardware cloth, metal (e.g., galvanized steel) screen 20B, 40B that is made from 19 gauge wire and has square shaped openings with the length of the sides of these squares being in the range of 1/4 inch to ⅝ inch, and (c) a coarse screen (e.g., made from expanded metal [galvanized steel]) 20C, 40C that is made from 18 gauge wire and has diamond shaped openings, and with each of these having four corners where the length dimension between the closest of these corners is in the range of 0.75-1.5 inches.

Figure 4:
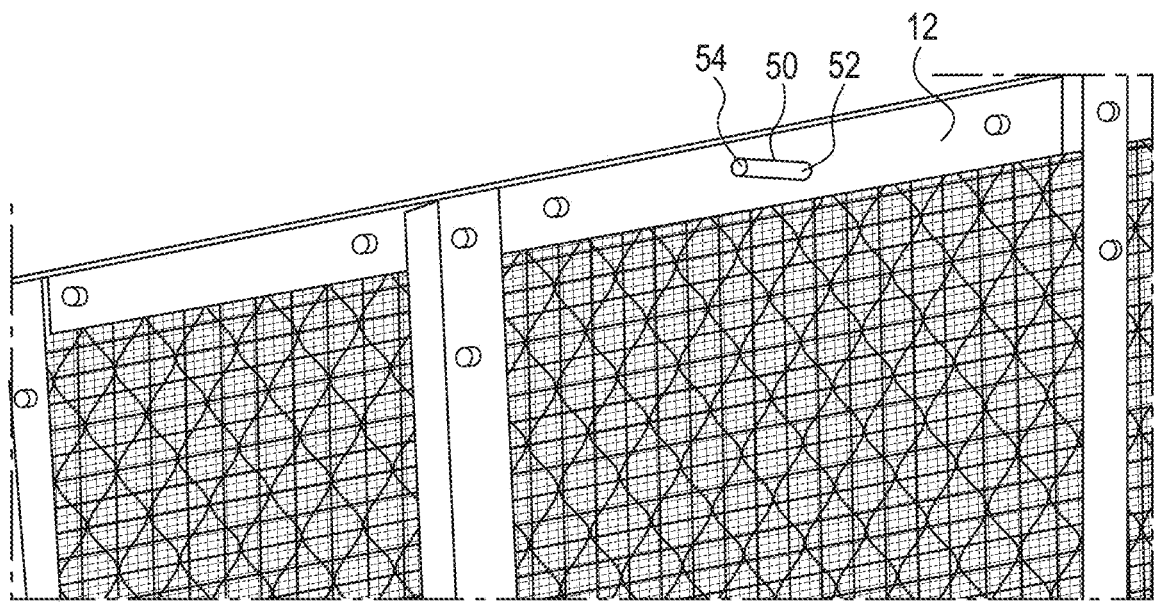
FIG. 4 is a perspective view of the inside portion of a part of the perimeter edge of the top frame of the present invention.

FIG. 4 is a perspective view of the inside portion of a part of the perimeter edge 12 of the top frame of the present invention. It shows an attachment device 50 that can be used to hold the frames in alignment when the top frame is stacked on the bottom frame to create a confined space 60 between them that is filled with replaceable, activated carbon granules 90. There are many ways to form such an attachment device (e.g., guide surfaces on the edges of the frames, use of a hinge between the frames), but the one shown in FIG. 4 consists of a screw 52 that has been passed through a point on the perimeter edge of the top frame so that the bottom part or free end 54 of this screw extends beneath this edge. At a corresponding point of the perimeter edge of the bottom frame 30, a hole is made that allows the free end of this screw to pass through this hole and thus through the bottom frame when the top frame is aligned and located on top of the bottom frame.

Figure 5:
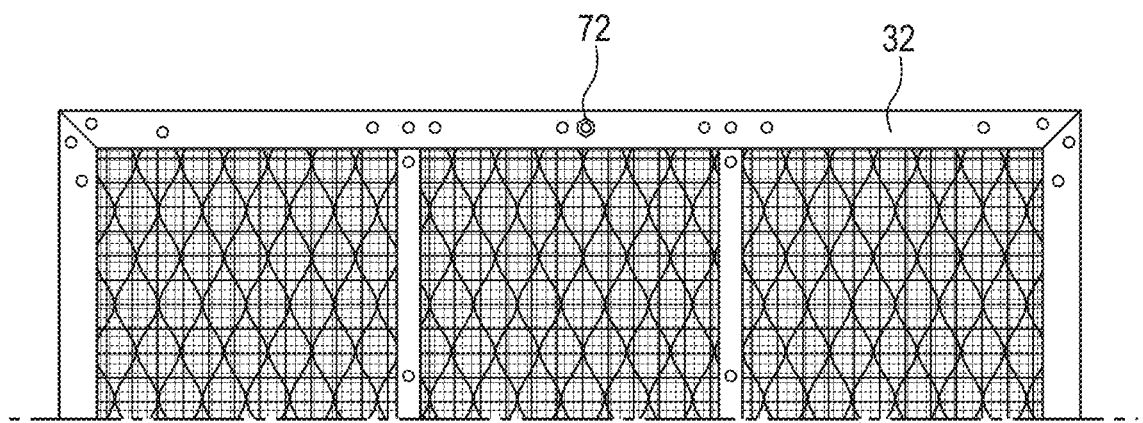
FIG. 5 is a perspective view from beneath the bottom frame and at the location where a hole has been made in the bottom frame to allow the free end of an attachment device to protrude through and have a locking device attached to it.

FIG. 5 shows a view from beneath the bottom frame 30 and at the location where this hole has been made in the bottom frame at this corresponding point. It can be seen that a simple nut or wing nut 72 has been attached to the free end 54 of the protruding screw to serve as a locking device 70 to lock the top 10 and bottom 30 frames together.

It is a simple matter to use the present invention. When the gaseous pollutant extraction ability of an initial portion of granules, that have been placed in the confined spaced between the top and bottom frames, is no longer effective (i.e., the granules are expired), the wing nut 72 is removed and the top frame is moved away from the bottom frame to allow the initial portion of granules to be removed and replaced by another portion of fresh granules. The top frame 10 is then again placed over the bottom frame 30 and they are again temporarily locked together until the next time the granules need to be replaced.

Many materials of construction (e.g., wood, heavy-duty cardboard) can be used to fabricate the frames of the present invention. The early prototype frames of the present invention were fabricated from aluminum in order to minimize the frames' weight while also providing them with sufficient rigidity.

Figure 6:
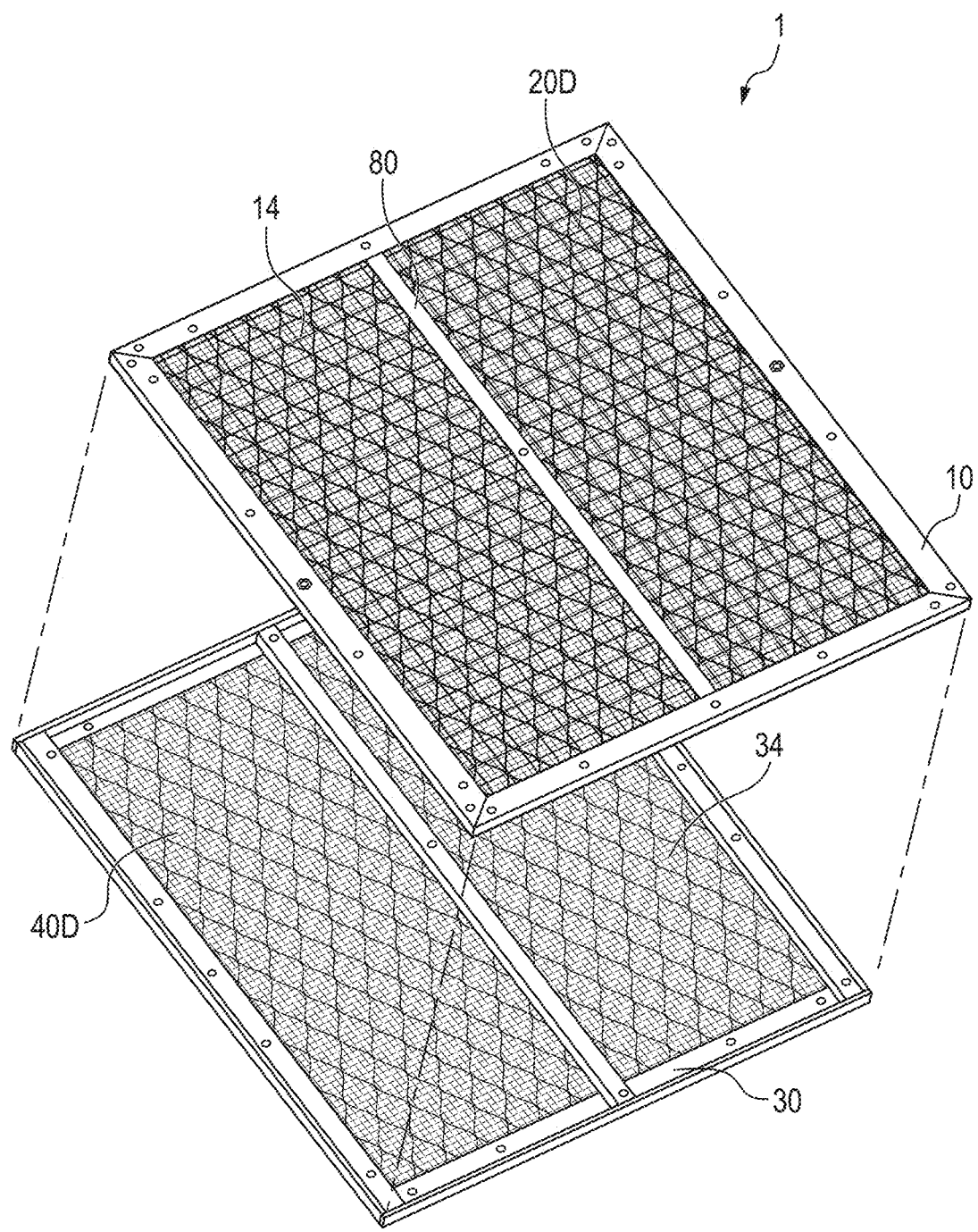
FIG. 6 is a top, perspective view of the present invention when its two frames have been separated and bamboo has been used to make the bottom frame and the course screen that is used in both frames.

Later prototypes were fabricated from bamboo for aesthetic and other reasons. These bamboo air cleaning devices all had rectangularly shaped frames. See FIG. 6. The bamboo is used to make the bottom frame and the course screen that is used in both frames and which is made from closely-packed-together, parallel, bamboo rods 20D, 40D that were stretched between the opposite ends of a frame. The irregularity of the diameters of these bamboo rods at various points between their ends is sufficient to provide adequate porosity to a bamboo screen even when the adjoining rods from which they are composed are side-by-side and effectively touching each other. The top frame has slightly smaller dimensions that the bottom frame so that it can fit into a grove that is made in the top surface of the bottom, bamboo frame. This top frame would usually be made from rectangular strips of wood. The same attachment and locking devices are used in this bamboo utilized embodiment. To remove the expired granules, one unlocks the top frame and removes it from the bottom and then empties the expired granules and replaces them with fresh granules.

Figure 7:
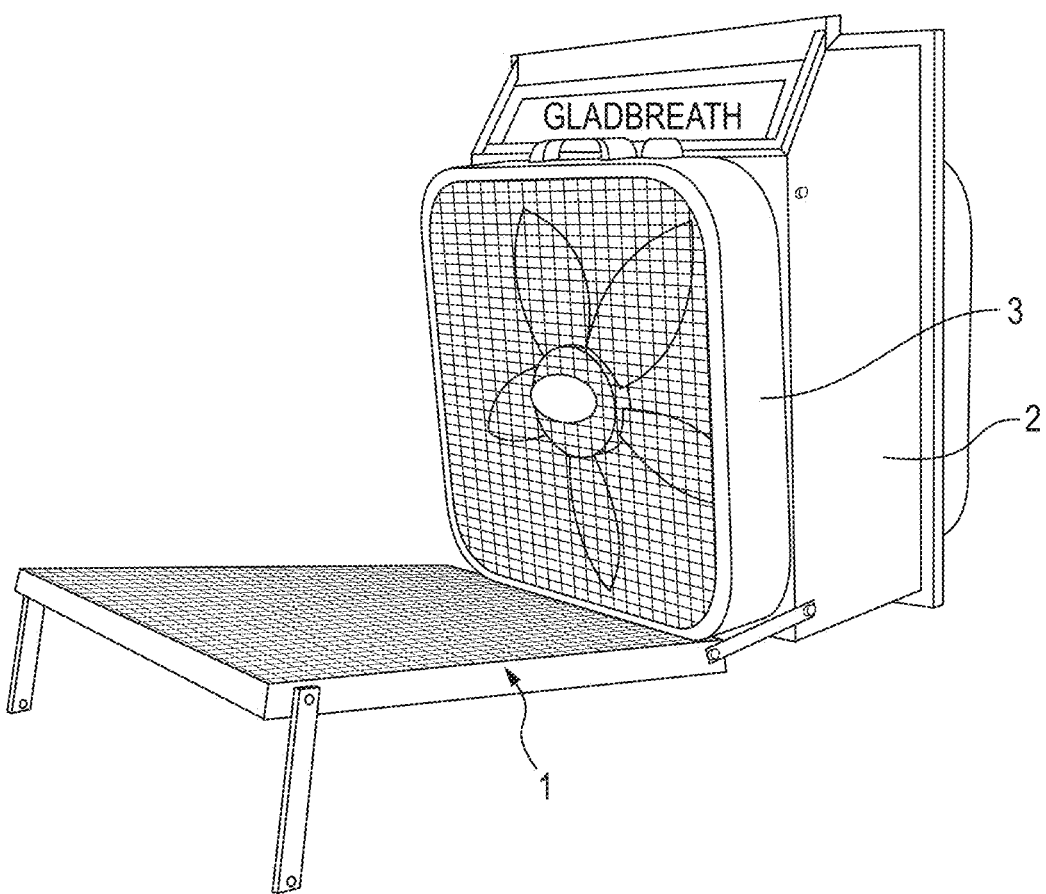
FIG. 7 is a perspective view of the present invention in use with a "Gladbreath Box".

FIG. 7 shows an example of the present invention 1 in use to clean smoke odors from a building that has had a small fire, and where the present invention is being used with the present inventor's "Gladbreath Box" 2 invention, see U.S. Pat. No. 11,603,865. The "Gladbreath Box" is seen to safely enable particulate, air filtering by using a pair of box fans 3 with a standard, 6" thick, MERV 13 (MERV, Minimum Efficiency Reporting Value) replaceable air filter that is placed inside the Box's back region. The present invention 1 is placed adjacent to the output side of one of the above-mentioned, box fans to force the air which has been cleaned of particles, by the MERV 13 filter, to now be cleaned of gaseous pollutants as the box fan's exhaust is forced to pass over and through the present invention.

Figure 8A:
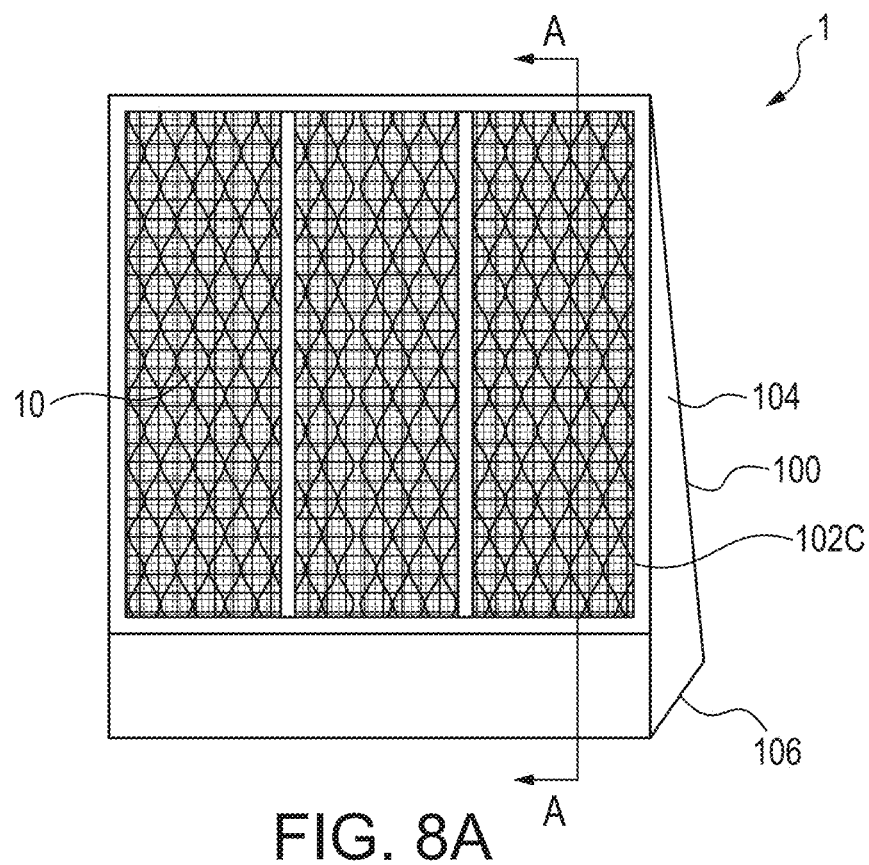
FIG. 8A is a front, perspective view of the present invention after a box and fan have been added to it.
Figure 8B:
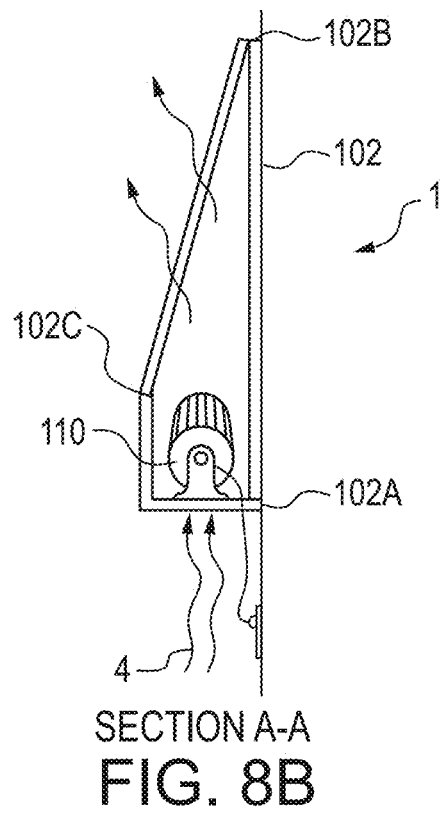
FIG. 8B is a side view taken along the sight lines A-A shown in FIG. 8A.
Figure 8C:
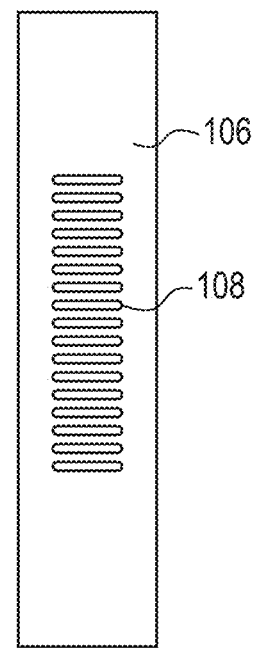
FIG. 8C is a bottom view of the present invention shown in FIG. 8A.

To further promote air flow through the present invention, it can be enclosed in a box 100 and a fan 110, within or attached to the box, used to draw air into the box and through the screens and activated, carbon granules of the present invention. See FIGS. 8A-8C. In this example, the box has an inverted-V shape, with two opposing, slanted walls 102 that are spread apart on their bottom ends 102A and joined together at their top ends 102B. The box also has two triangular shaped sides 104 and a rectangular bottom 106. The top 10 and bottom 30 frames, etc. are located in a first opening 102C in one of the walls and make up the largest part of this wall. An electric squirrel fan 110 is situated on the bottom 106 of this box and above a second opening or assortment of openings 108 in the box's bottom that are there to allow the fan to suck air into the box. This air then exits the box by passing through the present invention.

Key advantages of the present invention are that t is designed to be reusable (which reduces its overall operating costs because only its granules have to be replaced) and portable (which allows it to be used anywhere throughout a dwelling). For example, it can be placed in front a temporally placed fan, or anywhere else that there is some air movement which will enhance the present invention's ability to clean the air in its vicinity.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is set forth hereafter in the claims to the invention.

I claim:

1. A reusable, air cleaning device filled with granular, activated carbon comprising:
    a top frame having a specified shape that includes a top perimeter edge that encloses a top area defined by said top perimeter edge,
    a plurality of top screens, each of which has a top bounding edge and is configured to spread across said top perimeter edge and cover said top area,
    a bottom frame having said specified shape that includes a bottom perimeter edge that encloses a bottom area defined by said bottom perimeter edge,
    a plurality of bottom screens, each of which has a bottom bounding edge and is configured to spread across said bottom perimeter edge and cover said bottom area,
    an attachment means that is situated between said top and bottom perimeter edges and configured to: (a) temporarily hold said frames together so that said top frame lies above said bottom frame to temporarily create a confined space between said top and bottom screens, and (b) allow said frames to be temporarily moved apart from one another to provide access to said confined space,
    a locking device attached between said top and bottom perimeter edges and configured to temporarily lock said top and bottom frames together so that said top and bottom perimeter edges cannot be moved apart,
    wherein said top and bottom frames are configured so that when said top frame lies above said bottom frame said confined space is temporarily created between said top and bottom screens in which the distance between said plurality of top screens and said plurality of bottom screens is in the range of 0.25-0.75 inches,
    a plurality of activated carbon granules that are characterized by having the ability for a specified temporal duration to extract gaseous pollutants contained in air that passes over said granules, and with an initial portion of said granules being distributed on said bottom screen to temporarily cover said bottom area until said gaseous pollutant extraction ability of said initial portion of granules is no longer effective, and
    wherein said plurality of top and bottom screens are configured to have a combination of sizes that are chosen to prevent said plurality of activated carbon granules from passing through said plurality of top and bottom screens.

2. The reusable, air cleaning device as recited in claim 1, wherein:
    said plurality of activated carbon granules are characterized by having a size such that approximately 90% by weight of said granules pass through a sieve in the range of a #3-#5 sieve and approximately 90% by weight are captured by a sieve in the range of a #7-#9 sieve.

3. The reusable, air cleaning device as recited in claim 1, wherein:
    each of said top bounding edges of said plurality of top screens is attached to said perimeter edge of said top frame, and
    each of said bottom bounding edges of said plurality of bottom screens is attached to said perimeter edge of said bottom frame.

4. The reusable, air cleaning device as recited in claim 2, wherein:
    each of said top bounding edges of said plurality of top screens is attached to said perimeter edge of said top frame, and
    each of said bottom bounding edges of said plurality of bottom screens is attached to said perimeter edge of said bottom frame.

5. The reusable, air cleaning device as recited in claim 1, further comprising:
    a brace that attaches between distal points on said perimeter edge of said bottom frame and is configured to provide rigidity to said bottom frame.

6. The reusable, air cleaning device as recited in claim 2, further comprising:
    a brace that attaches between distal points on said perimeter edge of said bottom frame and is configured to provide rigidity to said bottom frame.

7. The reusable, air cleaning device as recited in claim 3, further comprising:
    a brace that attaches between distal points on said perimeter edge of said bottom frame and is configured to provide rigidity to said bottom frame.

8. The reusable, air cleaning device as recited in claim 4, further comprising:
a brace that attaches between distal points on said perimeter edge of said bottom frame and is configured to provide rigidity to said bottom frame.

9. The reusable, air cleaning device as recited in claim 1, wherein:
said plurality of both top and bottom screens includes a fine screen that has a plurality of openings, and each of said openings has a surface area that is in the range of 0.0035-0.0160 inches$^2$.

10. The reusable, air cleaning device as recited in claim 2, wherein:
said plurality of both top and bottom screens includes a fine screen that has a plurality of openings, and each of said openings has a surface area that is in the range of 0.0035-0.0160 inches$^2$.

11. The reusable, air cleaning device as recited in claim 4, wherein:
said plurality of both top and bottom screens includes a fine screen that has a plurality of openings, and each of said openings has a surface area that is in the range of 0.0035-0.0160 inches$^2$.

12. The reusable, air cleaning device as recited in claim 1, wherein:
said plurality of both top and bottom screens includes an expanded metal screen that has a plurality of diamond shaped openings, and each of said diamond shaped openings has four corners and where the length dimension between the closest of said four corners is in the range of 0.75-1.5 inches.

13. The reusable, air cleaning device as recited in claim 2, wherein:
said plurality of both top and bottom screens includes an expanded metal screen that has a plurality of diamond shaped openings, and each of said diamond shaped openings has four corners and where the length dimension between the closest of said four corners is in the range of 0.75-1.5 inches.

14. The reusable, air cleaning device as recited in claim 10, wherein:
said plurality of both top and bottom screens includes an expanded metal screen that has a plurality of diamond shaped openings, and each of said diamond shaped openings has four corners and where the length dimension between the closest of said four corners is in the range of 0.75-1.5 inches.

15. The reusable, air cleaning device as recited in claim 14, wherein:
said specified shape is a rectangle.

16. The reusable, air cleaning device as recited in claim 1, further comprising:
a box having a plurality of walls, and one of said walls having a first opening that is configured to surround and hold said reusable, air cleaning device so that said device forms a part of said wall,
a fan attached to said box and configured and oriented to draw air into said box, and
a second of said walls having a second opening that is configured to provide a passage for air into said box.

17. The reusable, air cleaning device as recited in claim 2, further comprising:
a box having a plurality of walls, and one of said walls having a first opening that is configured to surround and hold said reusable, air cleaning device so that said device forms a part of said wall,
a fan attached to said box and configured and oriented to draw air into said box, and
a second of said walls having a second opening that is configured to provide a passage for air into said box.

18. The reusable, air cleaning device as recited in claim 10, further comprising:
a box having a plurality of walls, and one of said walls having a first opening that is configured to surround and hold said reusable, air cleaning device so that said device forms a part of said wall,
a fan attached to said box and configured and oriented to draw air into said box, and
a second of said walls having a second opening that is configured to provide a passage for air into said box.

19. The reusable, air cleaning device as recited in claim 14, further comprising:
a box having a plurality of walls, and one of said walls having a first opening that is configured to surround and hold said reusable, air cleaning device so that said device forms a part of said wall,
a fan attached to said box and configured and oriented to draw air into said box, and
a second of said walls having a second opening that is configured to provide a passage for air into said box.

20. The reusable, air cleaning device as recited in claim 14, further comprising:
a box having a plurality of walls, and one of said walls having a first opening that is configured to surround and hold said reusable, air cleaning device so that said device forms a part of said wall,
a fan attached to said box and configured and oriented to draw air into said box, and
a second of said walls having a second opening that is configured to provide a passage for air into said box.

\* \* \* \* \*